(12) United States Patent
Dong (10) Patent No.: US 11,410,706 B2
(45) Date of Patent: Aug. 9, 2022

(54) CONTENT PUSHING METHOD FOR DISPLAY DEVICE, PUSHING DEVICE AND DISPLAY DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Wenchu Dong, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 225 days.

(21) Appl. No.: 16/643,112

(22) PCT Filed: Jul. 1, 2019

(86) PCT No.: PCT/CN2019/094255
§ 371 (c)(1),
(2) Date: Feb. 28, 2020

(87) PCT Pub. No.: WO2020/052324
PCT Pub. Date: Mar. 19, 2020

(65) Prior Publication Data
US 2021/0225408 A1    Jul. 22, 2021

(30) Foreign Application Priority Data

Sep. 11, 2018   (CN) .......................... 201811056287.4

(51) Int. Cl.
*G11B 27/19* (2006.01)
*G10L 15/02* (2006.01)
(Continued)

(52) U.S. Cl.
CPC .............. *G11B 27/19* (2013.01); *G10L 15/02* (2013.01); *G10L 15/063* (2013.01); *G10L 15/08* (2013.01); *G10L 25/51* (2013.01); *H04N 5/04* (2013.01)

(58) Field of Classification Search
None
See application file for complete search history.

(56) References Cited

U.S. PATENT DOCUMENTS

| | | | |
|---|---|---|---|
| 2008/0110322 A1 | 5/2008 | Lee et al. | |
| 2016/0005204 A1* | 1/2016 | Zeng | G06F 16/5866 715/202 |
| 2016/0134855 A1* | 5/2016 | Ishizaki | H04N 9/89 386/219 |

FOREIGN PATENT DOCUMENTS

| | | |
|---|---|---|
| CN | 101930446 A | 12/2010 |
| CN | 102737676 A | 10/2012 |

(Continued)

OTHER PUBLICATIONS

Office Action dated Dec. 13, 2019 for application No. CN201811056287.4 with English translation attached.
(Continued)

*Primary Examiner* — Heather R Jones
(74) *Attorney, Agent, or Firm* — Nath, Goldberg & Meyer; Joshua B. Goldberg (57) ABSTRACT

The present disclosure provides a content pushing method and device for a display device and a display device. The content pushing method includes: detecting audio in an environment; acquiring at least one keyword of the audio; acquiring a content to be displayed associated with the keyword of the audio; and pushing the content to be displayed to the display device to display the content to be displayed.

16 Claims, 6 Drawing Sheets

(51) Int. Cl.
*G10L 15/06* (2013.01)
*G10L 15/08* (2006.01)
*G10L 25/51* (2013.01)
*H04N 5/04* (2006.01)

(56) References Cited

FOREIGN PATENT DOCUMENTS

| | | |
|---|---|---|
| CN | 105224581 A | 1/2016 |
| CN | 106919662 A | 7/2017 |
| CN | 106921749 A | 7/2017 |
| CN | 107221347 A | 9/2017 |
| CN | 109802987 A | 5/2019 |

OTHER PUBLICATIONS

Office Action dated Jun. 29, 2020 for application No. CN201811056287.4 with English translation attached.

\* cited by examiner

FIG. 5

CONTENT PUSHING METHOD FOR DISPLAY DEVICE, PUSHING DEVICE AND DISPLAY DEVICE

CROSS-REFERENCE TO RELATED APPLICATION

This is a National Phase Application filed under 35 U.S.C. 371 as a national stage of PCT/CN2019/094255, filed on Jul. 1, 2019, an application claiming the benefit of Chinese Application No. 201811056287.4, filed on Sep. 11, 2018, the content of each of which is hereby incorporated by reference in its entirety.

TECHNICAL FIELD

The present disclosure relates to, but is not limited to, the field of display technology, and in particular, to a content pushing method for a display device, a push device, and a display device.

BACKGROUND

In places such as rest area of shopping mall, airport lounge, and exhibition hall, in order to enhance users' experience, users are often provided with visual and auditory services (such as music and video).

However, in actual applications, since the system for playing music and the system for playing video may be two independent systems, music and video contents often appear irrelevant. For example, the auditory service provides music but the visual service pushes advertisements, which brings a poor experience to users.

SUMMARY

This disclosure aiming to solve at least one of the technical problems existing in the prior art, provides a content pushing method for a display device, a push device, and a display device.

To achieve the above object, an embodiment of the present disclosure provides a content pushing method for a display device including: detecting audio in an environment; acquiring at least one keyword of the audio; acquiring a content to be displayed associated with the keyword of the audio; and pushing the content to be displayed to the display device for the display device to display the content to be displayed.

In an alternative embodiment, a step of the acquiring at least one keyword of the audio includes: acquiring audio information of the audio in the environment; matching the audio information with a sample audio segment in a database to determine the sample audio segment with a highest matching degree; and acquiring the keyword corresponding to the sample audio segment with the highest matching degree from the database as the keyword for the audio, wherein the database contains a plurality of sample audio segments and a plurality of keywords corresponding to the plurality of sample audio segments.

In an alternative embodiment, the audio information includes: a feature vector of the audio; a step of the acquiring audio information of the audio in the environment includes: performing feature extraction on the audio to obtain the feature vector of the audio; a step of the matching the audio information with a sample audio segment in a database to determine the sample audio segment with a highest matching degree includes: calculating similarity between the feature vector of the audio and the feature vector of the sample audio segment in the database; and determining the sample audio segment corresponding to a feature vector with the greatest similarity to the feature vector of the audio, as the sample audio segment with the highest matching degree.

In an alternative embodiment, the audio information includes: an audio segment corresponding to the audio; a step of the acquiring audio information of the audio in the environment includes: inputting the audio into an audio segment recognition model for recognition to determine the audio segment corresponding to the audio; a step of the matching the audio information with a sample audio segment in a database to determine the sample audio segment with a highest matching degree includes: calculating similarity between the audio segment corresponding to the audio and the sample audio segment in the database; and determining a sample audio segment with the greatest similarity to the audio segment corresponding to the audio, as the sample audio segment with the highest matching degree.

In an alternative embodiment, a step of the calculating similarity between the audio segment corresponding to the audio and the sample audio segment in the database includes: calculating similarity between an audio name of the audio segment corresponding to the audio and an audio name of the sample audio segment in the database.

In an alternative embodiment, after a step of the inputting the audio into an audio segment recognition model for recognition, the method further includes: adding the audio to a training set corresponding to the audio segment recognition model according to a recognition result, and training and updating the audio segment recognition model.

In an alternative embodiment, a step of acquiring at least one keyword of the audio includes: inputting the audio into a keyword recognition model for recognition to determine the keyword corresponding to the audio.

In an alternative embodiment, a step of the acquiring content to be displayed associated with the keyword of the audio includes: searching an optional display content associated with the keyword of the audio from a content repository or the Internet according to the keyword of the audio, wherein a searched optional display content serves as a candidate display content, and a plurality of display contents and keywords corresponding to the plurality of the display contents are stored in the content repository in advance; selecting at least one candidate display content from all searched candidate display contents as the content to be displayed.

In an alternative embodiment, a step of the selecting at least one candidate display content from all searched optional display contents as the content to be displayed includes: acquiring keywords corresponding to all candidate display contents from the content repository or the Internet; using a keyword similarity algorithm to separately calculate the similarity between the keyword of each of the all candidate display contents and the keyword of the audio; screening out the candidate display contents corresponding to similarity that is larger than a similarity threshold among all similarity; and selecting at least one candidate display content from the screened candidate display contents as the content to be displayed.

In an alternative embodiment, after a step of the acquiring a content to be displayed associated with the keyword of the audio, the method further includes: determining a content feature of the content to be displayed; determining a display mode corresponding to the content to be displayed according to the content feature; after a step of the pushing the content to be displayed to the display device, the method further includes: controlling the display device to display the content to be displayed in a determined display mode.

An embodiment of the present disclosure also provides a content pushing device for a display device includes: an audio detector configured to detect audio in an environment; a first acquirer configured to acquire at least one keyword of the audio; a second acquirer configured to acquire a content to be displayed associated with the keyword of the audio; and a pushing circuit configured to push the content to be displayed to the display device for the display device to display the content to be displayed.

In an alternative embodiment, the first acquirer includes: an audio information acquisition circuit configured to acquire audio information of the audio in the environment; a matching circuit configured to match the audio information with a sample audio segment in a database to determine the sample audio segment with a highest matching degree; and a keyword acquisition circuit configured to acquire the keyword corresponding to the sample audio segment with the highest matching degree from the database as the keyword for the audio, wherein the database contains a plurality of sample audio segments and a plurality of keywords corresponding to the plurality of sample audio segments.

In an alternative embodiment, the audio information includes: a feature vector of the audio; the audio information acquisition circuit includes: a feature extraction subcircuit configured to perform feature extraction on the audio to obtain the feature vector of the audio; the matching circuit includes: a first calculating subcircuit configured to calculate similarity between the feature vector of the audio and the feature vector of the sample audio segment in the database; a first determining subcircuit configured to determine the sample audio segment corresponding to a feature vector with the greatest similarity to the feature vector of the audio, as the sample audio segment with the highest matching degree.

In an alternative embodiment, the audio information includes: an audio segment corresponding to the audio; the audio information acquisition circuit includes: a segment recognition subcircuit configured recognize inputted audio by an audio segment recognition model, so as to determine the audio segment corresponding to the audio; the matching circuit includes: a second calculating subcircuit configured to calculate similarity between the audio segment corresponding to the audio and the sample audio segment in the database; and a second determining subcircuit configured to determine a sample audio segment with the greatest similarity to the audio segment corresponding to the audio, as the sample audio segment with the highest matching degree.

In an alternative embodiment, the second calculating subcircuit is configured to calculate similarity between an audio name of the audio segment corresponding to the audio and an audio name of the sample audio segment in the database.

In an alternative embodiment, the audio information acquisition circuit further includes: a training subcircuit configured to, after the segment recognition circuit finishes recognizing the audio, add the audio to a training set corresponding to the audio segment recognition model according to a recognition result, and train and update the audio segment recognition model.

In an alternative embodiment, the first acquirer includes: a keyword recognition circuit configured to recognize the inputted audio according to a keyword recognition model to determine the keyword corresponding to the audio.

In an alternative embodiment, the second acquirer includes: a searching circuit configured to search an optional display content associated with the keyword of the audio from a content repository or the Internet, wherein a searched optional display content serves as a candidate display content, and a plurality of display contents and keywords corresponding to the plurality of the display contents are stored in the content repository in advance; and a selecting circuit configured to select at least one candidate display content from all candidate display contents searched by the searching circuit as the content to be displayed.

In an alternative embodiment, the selecting circuit includes: a searching subcircuit configured to acquire keywords corresponding to all candidate display contents from the content repository or the Internet; a third calculating subcircuit configured to separately calculate the similarity between the keyword of each of the all candidate display contents and the keyword of the audio by a keyword similarity algorithm; a screening subcircuit configured to screen out the candidate display contents corresponding to similarity that is larger than a similarity threshold among all similarity; and a selecting subcircuit configured to select at least one candidate display content from the candidate display contents screened by the screening subcircuit as the content to be displayed.

In an alternative embodiment, the content pushing device further includes: a feature determination component, configured to determine a content feature of the content to be displayed; a mode determination component configured to determine a display mode corresponding to the content to be displayed according to the content feature; and a display control component configured to control the display device to display the content to be displayed in a determined display mode.

An embodiment of the present disclosure also provides a display device including: a display screen; at least one processor; and a storage medium configured to store a program and control, when the program runs, the at least one processor to execute the above content pushing method.

DETAILED DESCRIPTION OF THE EMBODIMENTS

In order to enable those skilled in the art to better understand the technical solutions of the present disclosure, hereinafter, a content pushing method for a display device, pushing device, and display device provided by the present disclosure will be described in detail with reference to the accompanying drawings.

It should be noted that "audio" in the present disclosure contains several forms such as music, broadcast, audiobooks and so on. The following embodiments takes pushing music as an example, but the present disclosure is not limit thereto. It should be noted that "music" in the present disclosure refers to a melody that can be played using a player. The embodiment of the present disclosure does not limit the playback form of the music.

Figure 1:
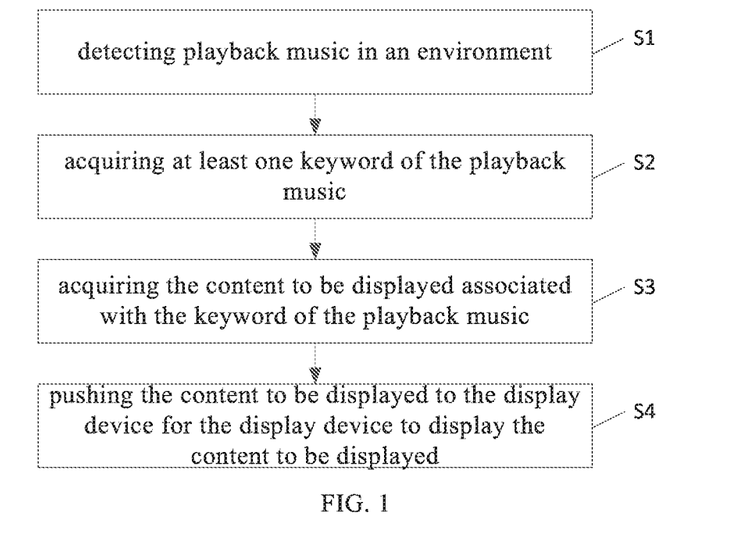
FIG. 1 is a flowchart of a content pushing method according to an embodiment of the present disclosure.

FIG. 1 is a flowchart of a content pushing method according to an embodiment of the present disclosure. The content pushing method is used to push content to a display device. As shown in FIG. 1, the content pushing method includes:

Step S1: detecting playback music in an environment.

In the step S1, the music detection component can be configured to start detecting the currently playing music every preset time (for example, 5s, which can be set as required). In an alternative embodiment, the music detection component includes a sound sensor (such as a microphone) and music extraction software; the sound sensor can sense sound information in the environment, and the music extraction software processes the sound information generated by the sound sensor to obtain the data of the currently playing music. For example, the data of the currently playing music may specifically include the melody and lyrics of the currently playing music.

Step S2: acquiring at least one keyword of the playback music.

In the step S2, keyword extraction may be performed on the currently playing music acquired in step S1 to obtain at least one keyword corresponding to the currently playing music.

In an alternative embodiment, the step S2 includes:

Step S201: acquiring music information of the playback music in the environment;

Step S202: matching the music information with a sample music segment in a database to determine the sample music segment with a highest matching degree; and Step S203: acquiring the keyword corresponding to the sample music segment with the highest matching degree from the database as the keyword for the playback music.

In an exemplary embodiment, a plurality of sample music segments and keywords corresponding to each sample music segment are recorded in the database. It should be noted that the number of keywords corresponding to the sample music segments may be the same or different, and the number of keywords corresponding to the sample music segments may specifically be one, two or more, which is not limited in this disclosure.

In practical applications, the sample music segments can be obtained from the Internet and keyword extraction can be performed on a regular or real-time basis to update the database. When the database extracts keywords from music segments, there are multiple types of keywords that are extracted, such as: music name, music type, music scene, music content, music mood, and so on. Here, the music type can include: pop music, Bel canto music, country music, jazz music, Latin music, rock music, popular music, classical music, folk music, and so on; the music scenes can include: chanting history songs, lyric songs, love songs, nursery songs, military songs, animation songs, and so on; the music content can include: people, flora and fauna, scenery, cars, sky, and so on; music mood can include: passion, cheerfulness, relaxation, anger, depression, tension, thriller, and so on.

For example, the music segment is "I am a little bird, and I want to fly but I can't fly too high". The corresponding keywords can be extracted as: I am a bird (music name), pop music (music type), lyric song (music scene), little bird (music content), fly (music content), depression (music mood), etc.

For example, the music segment is "The east of the Yangtze River flows away, and the waves wash away the heroes", and the corresponding keywords extracted may be: The east of the Yangtze River flows away (music name), Bel canto music (music type), chanting history songs (music scene), Yangtze River (music content), waves (music content), heroes (music content), passion (music mood), etc.

It should be noted that, in the present disclosure, when performing a keyword extraction on a music segment in a database, a Rapid Automatic Keyword Extraction (RAKE) algorithm, a Term Frequency-Inverse Document Frequency (TF-IDF) algorithm, and a Text Rank algorithm can also be applied. Definitely, other keyword extraction algorithms can also be applied in this disclosure, which will not be illustrated here one by one. Those skilled in the art should know that the technical solution of the present disclosure does not limit the algorithm applied when extracting keywords from the music segments in the database. Definitely, the keywords corresponding to the music segments in the database can also be manually configured according to actual needs.

Here, the music information may include: a feature vector of the playback music. In this case, the step S201 specifically includes:

Step S2011a: performing feature extraction on the playback music to obtain the feature vector of the playback music.

In the step S2011, a preset music feature extraction algorithm (such as a secondary feature extraction, a wavelet transform method, and a spectrum analysis method) may be applied to perform feature extraction on the currently playing music. The extracted features may include at least one of follows: audio time domain features (such as short-term energy, short-term average zero-crossing rate, etc.), frequency domain features, cepstrum features (such as linear prediction cepstrum coefficients, Mel frequency cepstrum coefficients, etc.). The extracted features constitute a feature vector of music.

Definitely, other feature extraction algorithms can also be applied for feature extraction in this disclosure, which will not be described here one by one.

In this case, the step S202 specifically includes:

Step S2021a: calculating similarity between the feature vector of the playback music and the feature vector of the sample music segment in the database.

In the step S2021a, for example, the cosine theorem of the vector space model or the method of combining the cosine theorem of the vector control model and Euclidean distance may be applied to calculate the similarity between the feature vectors.

It should be noted that in an embodiment of the present disclosure, a conventional vector similarity algorithm can be applied to calculate the similarity between the feature vector of the currently playing music and the feature vector of each sample music segment. The technical solution of the present disclosure does not limit the vector similarity algorithm applied in the step S2021.

Step S2022a: determining the sample music segment corresponding to a feature vector with the greatest similarity to the feature vector of the playback music, as the sample music segment with the highest matching degree.

The music information may include: a music segment corresponding to the playback music. In this case, the step S201 specifically includes:

Step S2011b: inputting the playback music into a preset music segment recognition model for recognition to determine the music segment corresponding to the playback music.

The music segment recognition model is based on a plurality of preset training sets (each training set corresponds to a class, and each sample corresponding to the same music segment is located in the same training set) and is obtained via training by applying a preset classification recognition algorithm. Specifically, some complete music (preferably some officially released music performances) and the music name corresponding to each complete music may be collected in advance from the Internet, and then complete music is segmented to obtain several real music segments. Each real music segment is regarded as a class. For each class, a large amount of music data that has performed the real music segment is collected from the Internet as sample data of this class (real music segment), so as to obtain the training set corresponding to this class.

In the step S2011b, the playback music is input into a music segment recognition model, and the music segment recognition model can recognize the input playback music and output a real music segment corresponding to the playback music. It should be noted that, in the step S2011, by identifying the currently playing music and outputting the corresponding real music segment, it can facilitate subsequent matching of the corresponding sample music segment from the database more accurately.

In an embodiment of the present disclosure, the music segment recognition model may be a shallow recognition model based on a multilayer perceptron, a support vector machine, Boosting or maximum entropy algorithm. The music segment recognition model may also be a deep recognition model based on Deep Neural Networks (DNN). In an exemplary embodiment, the biggest feature of a DNN compared to a shallow recognition model is the way in which features are selected. Sample features are selected by the experts in related fields based on their own experience in the shallow recognition model. Such model focuses on classification recognition or prediction tasks. The selection of sample features greatly affects the effectiveness of the algorithm. The essence of the DNN recognition model is that the multiple hidden layers learn the features of the data through a large number of data samples. Each hidden layer learns the features obtained by abstracting the data at different levels. Compared with the features selected manually, such features learned in layers can better reflect the nature of the data, and ultimately can improve the accuracy of classification or prediction.

It should be noted that, in the embodiments of the present disclosure, the classification recognition algorithm based on the music segment recognition model is not limited.

In this case, the step S202 specifically includes:

Step S2021b: calculating similarity between the music segment corresponding to the playback music and the sample music segment in the database.

In an alternative embodiment, in the step S2021b, it may calculate similarity between a music name of the real music segment corresponding to the currently playing music and a music name of the sample music segment in the database.

Definitely, the similarity of two music segments can also be characterized based on other content. For example, calculate the similarity between feature vectors of two music segments, or calculate the similarity of tunes of two music segments. The calculation of similarity will not be illustrated here one by one.

Step S2022b: determining a sample music segment with the greatest similarity to the music segment corresponding to the playback music, as the sample music segment with the highest matching degree.

In this embodiment, preferably, after the step S2011b, the method further includes:

Step S2012b: adding the playback music to a training set corresponding to the music segment recognition model according to a recognition result, and training and updating the music segment recognition model.

In the step S2012b, updating the music segment recognition model according to the recognition result can effectively improve the recognition accuracy of the music segment recognition model.

As another alternative embodiment, the step S2 includes:

Step S200: inputting the playback music into a keyword recognition model for recognition to determine the keyword corresponding to the playback music.

As described above, there can be multiple types of keywords (such as music name, music type, music scene, music content, music mood, and so on), and each keyword type can include multiple classes (for example: music type can include: pop music, Bel canto music, country music, jazz music, Latin music, rock music, popular music, classical music, folk music, and so on; the music scenes can include: chanting history songs, lyric songs, love songs, nursery songs, military songs, animation songs, and so on). To this end, a keyword recognition model can be designed for each keyword type, and the keyword recognition model can recognize the input music segment to determine the class of the input music segment in the keyword type.

Taking creation of the keyword recognition model corresponding to the music type as an example, "pop music", "Bel canto music", "country music", "jazz music", "Latin music", "popular music", "classical music", and "folk music" may be considered as a class, respectively. For each class, a corresponding training set can be established. Taking creation of the training set corresponding to "pop music" as an example, some segments of pop music can be obtained from the Internet as training samples to form the training set corresponding to "pop music". Using a similar method, various types of corresponding training sets can be obtained. Finally, each training set is trained to obtain a keyword recognition model that can identify the music type. After inputting the currently playing music to the keyword recognition model, the keyword recognition model can output the music type corresponding to the currently playing music, and the output result can be used as a keyword of the currently playing music.

Based on the same principle described above, for different keyword types, a corresponding keyword recognition model can be designed respectively. In the step S200, different keyword recognition models are used to identify the music name, music type, music scene, music content, music mood, etc. of the currently playing music, and the output is used as the keywords corresponding to the currently playing music.

It should be noted that the embodiments of the present disclosure do not limit the number of keyword recognition models and the classification recognition algorithms based on them.

Step S3: acquiring the content to be displayed associated with the keyword of the playback music.

In an alternative embodiment, the step S3 may include:

Step S301: searching an optional display content associated with the keyword of the playback music from a preset content repository or the Internet, and a searched optional display content serves as a candidate display content.

A plurality of display contents and keywords corresponding to each display content are stored in the content repository in advance; the display contents may specifically be character introduction, music introduction, related paintings, video clips, and the like. The keywords corresponding to the display content can be person names, person keywords, music keywords, painting names, painting content keywords, painting author keywords, historical keywords, video content keywords, and so on. The keywords corresponding to each display content can be added, deleted, and modified as required.

It should be noted that, in the embodiments of the present disclosure, the "optional display content associated with the keywords of the playback music" specifically refers to the optional display contents at the intersection of a set consisting of all the keywords and the a set consisting of all the keywords corresponding to the playback music (both sets have at least one identical element).

In the step S301, each keyword corresponding to the playback music is used as a search vocabulary, and is searched in the content repository to obtain several candidate display contents.

The step S3 may include: step S302: selecting at least one candidate display content from all searched candidate display contents as the content to be displayed.

As an alternative solution, in the step S302, one or more of the candidate display contents searched in the step S301 may be randomly selected as the content to be displayed.

As another alternative solution, the step S302 includes:

Step S3021: acquiring keyword corresponding to each candidate display content from the content repository or the Internet; and Step S3022: using a preset keyword similarity algorithm to separately calculate the similarity between the keyword of the candidate display content and the keyword of the playback music;

For each candidate display content, all keywords corresponding to the candidate display content constitute a keyword set of this candidate display content; all keywords corresponding to the currently playing music constitute a keyword set. In the step S3022, a preset keyword similarity algorithm (set similarity algorithm) is used to calculate the similarity of the keywords between each candidate display content and the currently playing music.

Step S3023: screening out the candidate display content whose keywords have similarity with the currently playing music that is greater than a preset similarity threshold.

The preset similarity threshold can be designed and adjusted according to actual needs.

Step S3024: selecting at least one candidate display content from the screened candidate display contents as the content to be displayed.

The embodiment of the present disclosure does not limit the algorithm used to select content to be displayed from candidate display content whose similarity is greater than a preset similarity threshold. For example, one candidate display content with the highest similarity may be used as the content to be displayed; or all the candidate display contents with similarity greater than a preset similarity threshold are used as the content to be displayed for the display device to play orderly (suitable for order play scenes).

Step S4: pushing the content to be displayed to the display device for the display device to display the content to be displayed.

In the step S4, the content to be displayed obtained in the step S3 is sent to a display device, so as to display the content to be displayed associated with the currently playing music. At this time, the content received by the user's auditory senses is correlated with the content perceived by the visual senses, and the auditory information processed by the user's brain matches the visual information, thereby improving the user's experience.

It should be noted that, in practical applications, the display content is pushed according to the current partial music segment every preset time. For a complete piece of music, the entire process can be regarded as pushing a video composed of multiple content to be displayed to the display device.

The embodiment of the present disclosure provides a method for pushing display content, which can push the associated display content to a display device according to the currently playing music in the environment, so that the content received by the user's auditory senses is correlated with the content perceived by the visual senses, thereby improving the user's experience.

Figure 2:
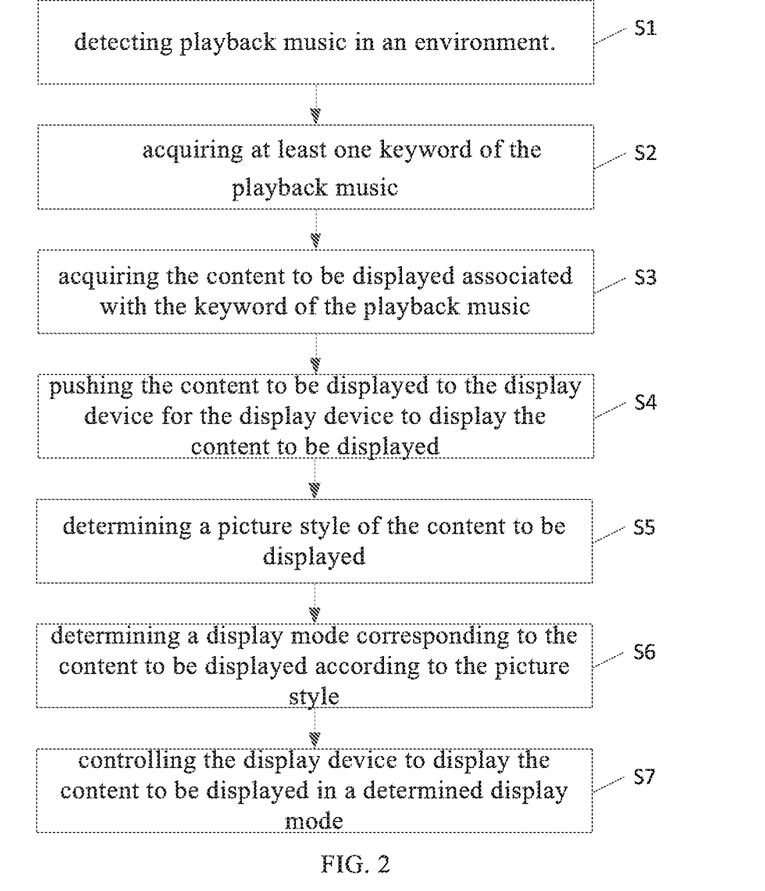
FIG. 2 is a flowchart of a content pushing method according to an embodiment of the present disclosure.

FIG. 2 is a flowchart of a content pushing method according to an embodiment of the present disclosure. As shown in FIG. 2, the content pushing method further includes steps S5 to S7 in addition to steps S1 to S4 in the above embodiment. Specifically, the content pushing method includes:

Step S5: determining a content feature of the content to be displayed.

It should be noted that the content features in the present disclosure may specifically include the picture style, content theme, painting type, and the like of the content to be displayed. Content theme includes landscape painting, portraits, architecture, and the like. Painting types include oil painting, watercolor painting, Chinese painting, sketching, and the like. Taking the content feature including the screen style as an example, the screen (content) style displayed by the display device is classified and designed in advance. For example, the picture style can be divided into sad pictures, festive pictures, modern pictures, retro pictures and so on. A plurality of pictures of each style type can be collected in advance to form a training set corresponding to each style type, and then a classification recognition model capable of identifying the type of the picture style is trained based on the training set. Before displaying, the classification recognition model is used to determine the picture style of the content to be displayed.

Step S6: determining a display mode corresponding to the content to be displayed according to the content feature.

The display device can support different display modes, and different display modes have certain differences in terms of brightness, hue, contrast, saturation, and the like. The display modes may include: fresh and cold display mode, fresh and warm display mode, silver tone display mode, black and white display mode, and the like.

Step S7: controlling the display device to display the content to be displayed in a determined display mode.

In an embodiment of the present disclosure, a correspondence relationship between different content features and a display mode is established in advance. Taking the content feature including the picture style as an example, the sad picture corresponds to the fresh and cold display mode, the festive picture corresponds to the fresh and warm display mode, the modern picture corresponds to the silver tone display mode, and the retro picture corresponds to the black and white display mode. In this case, in the step S6, the corresponding display mode can be determined according to the picture style determined in step S5; in the step S7, the display device can be controlled to display the content to be displayed according to the display mode determined in the step S6, so that the content to be displayed is displayed in an appropriate display mode, thereby further improving the user's experience.

It should be noted that the case where the step S5 in FIG. 2 is performed after the step S4 is merely exemplary. For example, in the embodiment of the present disclosure, it is only necessary that the step S5 is performed after the step S3, and the step S7 is performed after the step S4.

Figure 3:
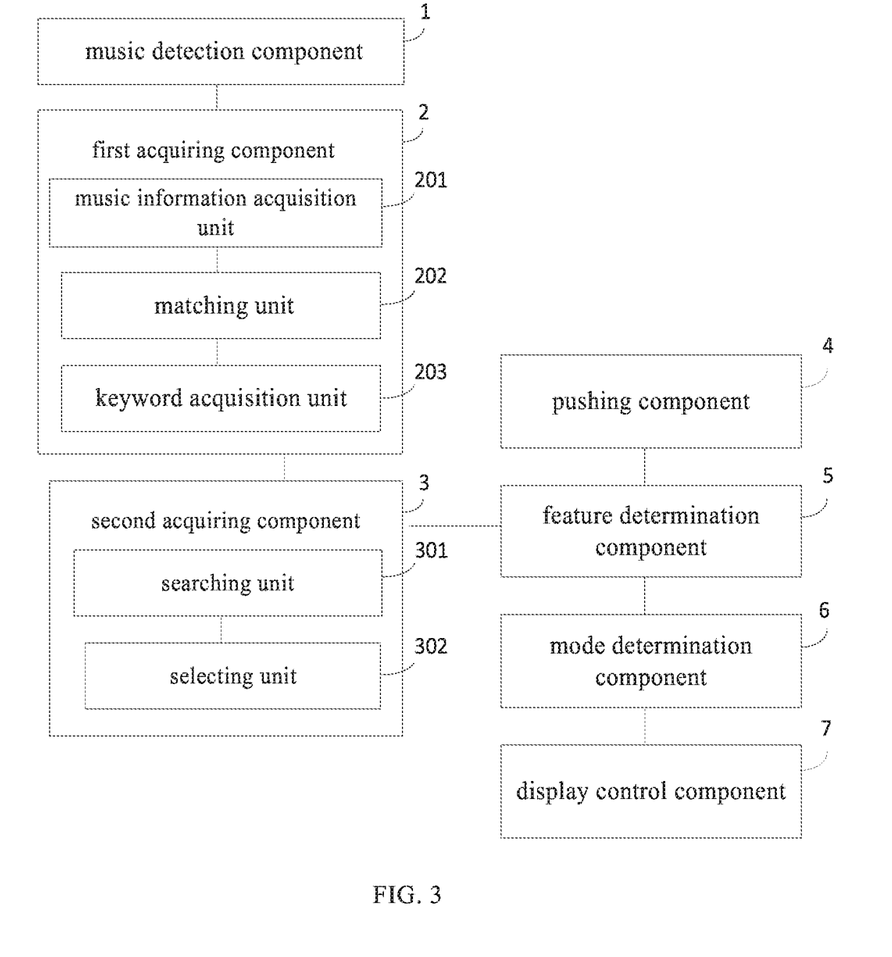
FIG. 3 is a schematic structural diagram of a content pushing device according to an embodiment of the present disclosure.

FIG. 3 is a schematic structural diagram of a content pushing device according to an embodiment of the present disclosure. As shown in FIG. 3, the content pushing device may be used to implement the content pushing method provided by the foregoing embodiments. The content pushing device includes: a music detection component 1, a first acquiring component 2, a second acquiring component 3, and a pushing component 4.

The music detection component 1 is configured to detect playback music in an environment.

The first acquiring component 2 is configured to acquire at least one keyword of the playback music.

The second acquiring component 3 is configured to acquire a content to be displayed associated with the keyword of the playback music.

The pushing component 4 is configured to push the content to be displayed to the display device for the display device to display the content to be displayed.

In one exemplary embodiment, the music detection component 1 may include, for example, a microphone or a sound sensor. The first acquiring component 2, the second acquiring component 3, and the pushing component 4 may be implemented by hardware such as a CPU, FPGA, and IC.

It should be noted that the music detection component 1 in this embodiment may perform the step S1 in the above embodiments, the first acquiring component 2 may perform the step S2 in the foregoing embodiments, the second acquiring component 3 may perform the step S3 in the foregoing embodiments, and the pushing component 4 can perform the step S4 in the foregoing embodiments. For a detailed description of each component, please refer to the content in the foregoing embodiments.

Figure 4A:
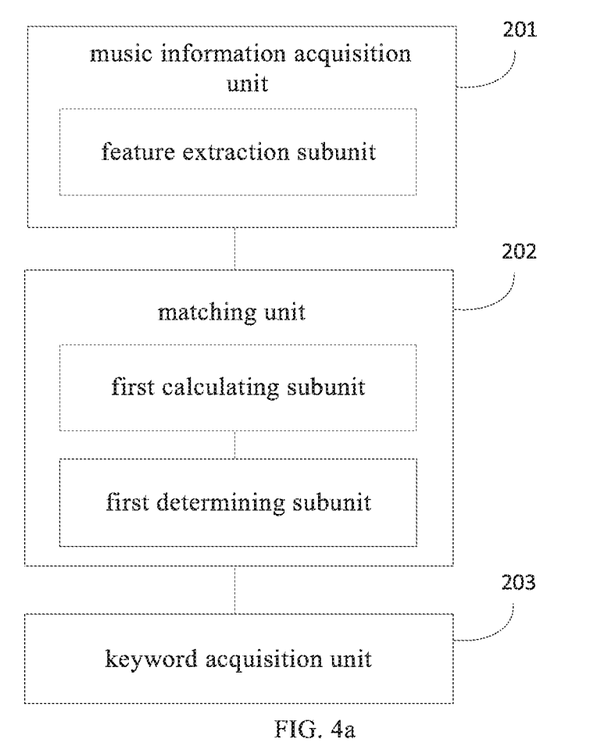
FIG. 4a is a schematic structural diagram of a first acquiring component in FIG. 3.

FIG. 4a is a schematic structural diagram of a first acquiring component in FIG. 3. As shown in FIG. 4a, the first acquiring component 2 includes: a music information acquisition unit 201, a matching unit 202, and a keyword acquisition unit 203.

The music information acquisition unit 201 is configured to acquire music information of the playback music in the environment.

The matching unit 202 is configured to match the music information with a sample music segment in a database to determine the sample music segment with a highest matching degree, and the database records multiple sample music segments and keywords corresponding to the sample music segments.

The keyword acquisition unit 203 is configured to acquire the keyword corresponding to the sample music segment with the highest matching degree from the database as the keyword for the playback music.

It should be noted that the music information acquisition unit 201 in this embodiment may be used to perform the step S201 in the foregoing embodiments, the matching unit 202 may be used to perform the step S202 in the foregoing embodiments, and the keyword acquisition unit 203 may be used to perform the step S203 in the foregoing embodiments.

Further, in an alternative embodiment, an actual music information includes: a feature vector of the playback music. In this case, the music information acquisition unit 201 includes a feature extraction subunit, and the matching unit 202 includes a first calculating subunit and a first determining subunit.

The feature extraction subunit is configured to perform feature extraction on the playback music to obtain the feature vector of the playback music.

The first calculating subunit is configured to calculate similarity between the feature vector of the playback music and the feature vector of the sample music segment in the database.

The first determining subunit is configured to determine the sample music segment corresponding to a feature vector with the greatest similarity to the feature vector of the currently playing music, as the sample music segment with the highest matching degree.

Figure 4B:
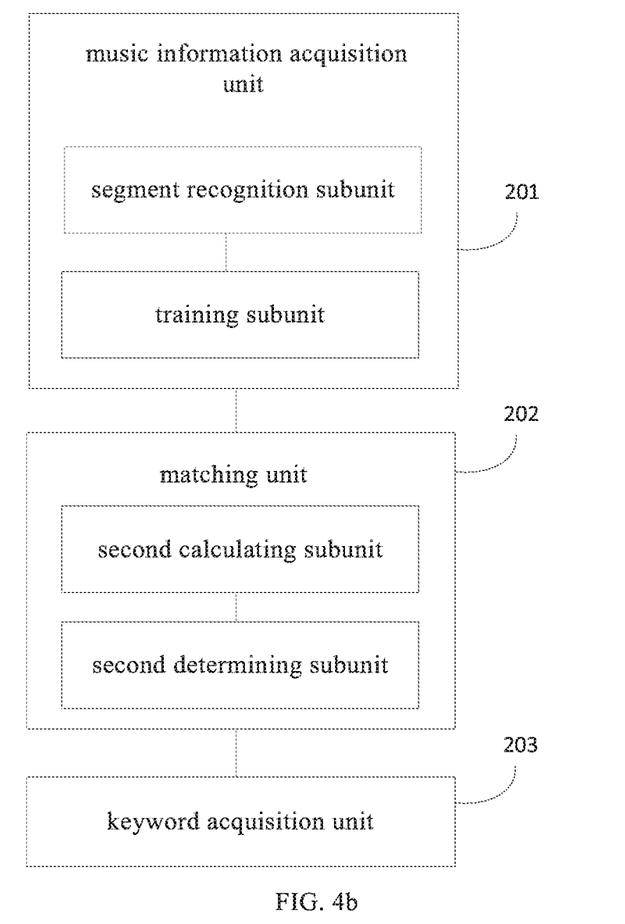
FIG. 4b is another schematic structural diagram of the first acquiring component in FIG. 3.

FIG. 4b is another schematic structural diagram of the first acquiring component in FIG. 3. As shown in FIG. 4b, different from that shown in FIG. 4a, the music information includes a music segment corresponding to the playback music. In this case, the music information acquisition unit 201 includes a segment recognition subunit, and the matching unit 202 includes a second calculating subunit and a second determining subunit.

The segment recognition subunit is configured recognize inputted playback music by a preset music segment recognition model, so as to determine the music segment corresponding to the playback music. It should be noted that the storage location of the music segment recognition model is not specifically limited. The music segment recognition model may be stored in the segment recognition subunit, or may be stored on a server and called from the server when the segment recognition subunit is working.

The second calculating subunit is configured to calculate similarity between the music segment corresponding to the playback music and the sample music segment in the database.

The second determining subunit is configured to determine a sample music segment with the greatest similarity to the music segment corresponding to the playback music, as the sample music segment with the highest matching degree.

Further, in an alternative embodiment, the second calculating subunit is configured to calculate similarity between a music name of the music segment corresponding to the playback music and a music name of the sample music segment in the database.

The music information acquisition unit 201 further includes: a training subunit configured to, after the segment recognition unit finishes recognizing the playback music, add the playback music to a training set corresponding to the music segment recognition model according to a recognition result, and train and update the music segment recognition model.

As another alternative solution, the first acquiring component includes a keyword recognition unit (not shown) configured to recognize the inputted playback music according to a preset keyword recognition model to determine the keyword corresponding to the playback music. It should be noted that the storage location of the keyword recognition model is not specifically limited. The keyword recognition model may be stored in the keyword recognition unit, or may be stored on a background server and called directly from the server when the keyword recognition unit is working.

In an alternative embodiment, the second acquiring component 2 includes a searching unit 301 and a selecting unit 302.

The searching unit 301 is configured to search a display content associated with the keyword of the playback music from a preset content repository or the Internet. The searched display content serves as a candidate display content, and a plurality of display contents and keywords corresponding to the plurality of the display contents are stored in the content repository in advance.

The selecting unit 302 is configured to select at least one candidate display content from all candidate display contents searched by the searching unit as the content to be displayed.

Figure 5:
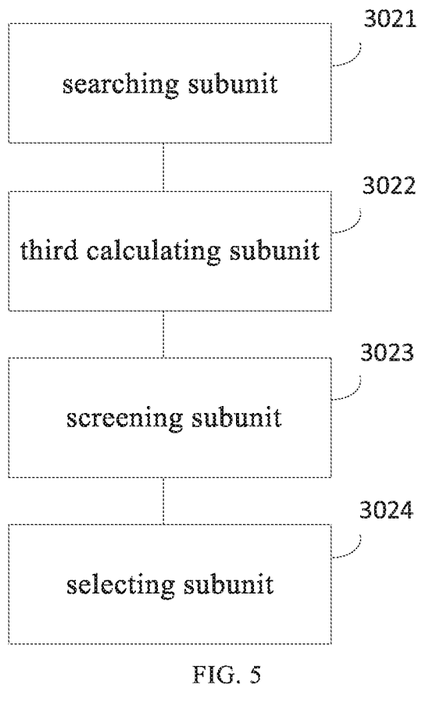
FIG. 5 is a schematic structural diagram of a selecting unit in the present disclosure.

FIG. 5 is a schematic structural diagram of a selecting unit in the present disclosure. As shown in FIG. 5, in an alternative embodiment, the selecting unit 302 includes a searching subunit 3021, a third calculating subunit 3022, a screening subunit 3023, and a selecting subunit 3024.

The searching subunit 3021 is configured to acquire keywords corresponding to all candidate display contents from the content repository or the Internet.

The third calculating subunit 3022 is configured to separately calculate the similarity between the keyword of each of the all candidate display contents and the keyword of the playback music by a preset keyword similarity algorithm.

The screening subunit 3023 is configured to screen out the candidate display contents corresponding to similarity that is larger than a preset similarity threshold among all similarity.

The selecting subunit 3024 is configured to select at least one candidate display content from the candidate display contents screened by the screening subunit 3023 as the content to be displayed.

It should be noted that the searching unit 301 in this embodiment may perform the step S301 in the foregoing embodiments, the selecting unit 302 may perform the step S302 in the foregoing embodiments, and the searching subunit 3021 may perform the step S3021 in the foregoing embodiments, the third calculating subunit 3022 may perform the step S3022 in the foregoing embodiments, the screening subunit 3023 may perform the step S3023 in the foregoing embodiments, and the selecting subunit 3024 may perform the step S3024 in the foregoing embodiments.

In an alternative embodiment, the content pushing device further includes a feature determination component 5, a mode determination component 6, and a display control component 7.

The feature determination component 5 is configured to determine a content feature of the content to be displayed.

The mode determination component 6 is configured to determine a display mode corresponding to the content to be displayed according to the content feature.

The display control component 7 is configured to control the display device to display the content to be displayed in a determined display mode. In one exemplary embodiment, the display control component may include, for example, a display, an electronic picture frame, and the like.

It should be noted that the feature determination component 5 in this embodiment may perform the step S5 in the foregoing embodiments, the mode determination component 6 may perform the step S6 in the foregoing embodiments, and the display control component 7 may perform the step 7 in the foregoing embodiments.

As a specific implementation, the music detection component in the present disclosure may be disposed near the display device or integrated on the display device, and the first acquiring component, the second acquiring component, and the pushing component may be disposed on a server. The server can push display content to the display device through a wired/wireless network.

As another specific implementation, the content pushing device is integrated on the display device as a whole; or the pushing device is entirely provided near the display device.

It should be noted that the technical solution of the present disclosure does not limit the positional relationship and setting manner between the content pushing device and the display device.

An embodiment of the present disclosure provides a display device including a display screen, at least one processor, and a storage medium configured to store a program and control, when the program runs, the at least one processor to execute the content pushing method as described in foregoing embodiments. The display screen is used to display content to be displayed.

The above program includes computer program code. The computer program code may be in a source code form, an object code form, an executable file, or intermediate form. The above storage medium may include: any entity or device capable of carrying the computer program code, a recording medium, a U disk, a mobile hard disk, a magnetic disk, a compact disc, a computer memory, a read-only memory (ROM), and a Random Access Memory (RAM), etc.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A content pushing method for a display device comprises:
   detecting audio in an environment;
   acquiring at least one keyword of the audio;
   acquiring a content to be displayed associated with the keyword of the audio; and
   pushing the content to be displayed to the display device for the display device to display the content to be displayed,
   wherein a step of the acquiring at least one keyword of the audio comprises:
   acquiring audio information of the audio in the environment;
   matching the audio information with a sample audio segment in a database to determine the sample audio segment with a highest matching degree; and
   acquiring the keyword corresponding to the sample audio segment with the highest matching degree from the database as the keyword for the audio,
   wherein the database contains a plurality of sample audio segments and a plurality of keywords corresponding to the plurality of sample audio segments,
   wherein the audio information comprises; an audio segment corresponding to the audio;
   a step of the acquiring audio information of the audio in the environment comprises; inputting the audio into an audio segment recognition model for recognition to determine the audio segment corresponding to the audio,
   wherein after a step of the inputting the audio into an audio segment recognition model for recognition, the method further comprises:
   adding the audio to a training set corresponding to the audio segment recognition model according to a recognition result, and training and updating the audio segment recognition model, wherein the audio segment recognition model is based on a plurality of training sets and is obtained via training by applying a classification recognition algorithm, and each training set corresponds to a class, and each sample corresponding to the same audio segment is located in the same training set, wherein a step of the acquiring the audio segment recognition model comprises;

some complete music and the music name corresponding to each complete music is collected from the Internet, and then complete music is segmented to obtain several real music segments, each real music segment is regarded as a class, for each class, a large amount of music data that has performed the real music segment is collected from the Internet as sample data of the each class, so as to obtain the training set corresponding to the each class.

2. The content pushing method of claim 1, wherein the audio information comprises: a feature vector of the audio;

a step of the acquiring audio information of the audio in the environment comprises: performing feature extraction on the audio to obtain the feature vector of the audio;

a step of the matching the audio information with a sample audio segment in a database to determine the sample audio segment with a highest matching degree comprises: calculating similarity between the feature vector of the audio and the feature vector of the sample audio segment in the database; and determining the sample audio segment corresponding to a feature vector with the greatest similarity to the feature vector of the audio, as the sample audio segment with the highest matching degree.

3. The content pushing method of claim 1, wherein a step of the matching the audio information with a sample audio segment in a database to determine the sample audio segment with a highest matching degree comprises:

calculating similarity between the audio segment corresponding to the audio and the sample audio segment in the database; and determining a sample audio segment with the greatest similarity to the audio segment corresponding to the audio, as the sample audio segment with the highest matching degree.

4. The content pushing method of claim 3, wherein a step of the calculating similarity between the audio segment corresponding to the audio and the sample audio segment in the database comprises:

calculating similarity between an audio name of the audio segment corresponding to the audio and an audio name of the sample audio segment in the database.

5. The content pushing method of claim 1, wherein a step of acquiring at least one keyword of the audio comprises:

inputting the audio into a keyword recognition model for recognition to determine the keyword corresponding to the audio.

6. The content pushing method of claim 1, wherein a step of the acquiring content to be displayed associated with the keyword of the audio comprises:

searching an optional display content associated with the keyword of the audio from a content repository or the Internet according to the keyword of the audio, wherein a searched optional display content serves as a candidate display content, and a plurality of display contents and keywords corresponding to the plurality of the display contents are stored in the content repository in advance;

selecting at least one candidate display content from all searched candidate display contents as the content to be displayed.

7. The content pushing method of claim 6, wherein a step of the selecting at least one candidate display content from all searched optional display contents as the content to be displayed comprises:

acquiring keywords corresponding to all candidate display contents from the content repository or the Internet;

using a keyword similarity algorithm to separately calculate the similarity between the keyword of each of the all candidate display contents and the keyword of the audio;

screening out the candidate display contents corresponding to similarity that is larger than a similarity threshold among all similarity; and selecting at least one candidate display content from the screened candidate display contents as the content to be displayed.

8. The content pushing method of claim 1, wherein after a step of the acquiring a content to be displayed associated with the keyword of the audio, the method further comprises:

determining a content feature of the content to be displayed;

determining a display mode corresponding to the content to be displayed according to the content feature;

after a step of the pushing the content to be displayed to the display device, the method further comprises:

controlling the display device to display the content to be displayed in a determined display mode.

9. A content pushing device for a display device comprises:

an audio detector configured to detect audio in an environment;

a first acquirer configured to acquire at least one keyword of the audio;

a second acquirer configured to acquire a content to be displayed associated with the keyword of the audio; and a pushing circuit configured to push the content to be displayed to the display device for the display device to display the content to be displayed, wherein the first acquirer comprises:

an audio information acquisition circuit configured to acquire audio information of the audio in the environment;

a matching circuit configured to match the audio information with a sample audio segment in a database to determine the sample audio segment with a highest matching degree; and a keyword acquisition circuit configured to acquire the keyword corresponding to the sample audio segment with the highest matching degree from the database as the keyword for the audio, wherein the database contains a plurality of sample audio segments and a plurality of keywords corresponding to the plurality of sample audio segments, wherein the audio information comprises: an audio segment corresponding to the audio;

the audio information acquisition circuit comprises:

a segment recognition subcircuit configured recognize inputted audio by an audio segment recognition model, so as to determine the audio segment corresponding to the audio;

wherein the audio information acquisition circuit further comprises:

a training subcircuit configured to, after the segment recognition circuit finishes recognizing the audio, add the audio to a training set corresponding to the audio segment recognition model according to a recognition result, and train and update the audio segment recognition model where in the audio segment recognition model is based on a plurality of training sets and is obtained via training by applying a classification recognition algorithm, and each training set corresponds to a class, and each sample corresponding to the same audio segment is located in the same training set, wherein a step of the acquiring the audio segment recognition model comprises:

some complete music and the music name corresponding to each complete music is collected from the Internet, and then complete music is segmented to obtain several real music segments, each real music segment is regarded as a class, for each class, a large amount of music data that has performed the real music segment is collected from the Internet as sample data of the each class, so as to obtain the training set corresponding to the each class.

10. The content pushing device of claim 9, wherein the audio information comprises: a feature vector of the audio;

the audio information acquisition circuit comprises:

a feature extraction subcircuit configured to perform feature extraction on the audio to obtain the feature vector of the audio;

the matching circuit comprises:

a first calculating subcircuit configured to calculate similarity between the feature vector of the audio and the feature vector of the sample audio segment in the database;

a first determining subcircuit configured to determine the sample audio segment corresponding to a feature vector with the greatest similarity to the feature vector of the audio, as the sample audio segment with the highest matching degree.

11. The content pushing device of claim 9, wherein the matching circuit comprises:

a second calculating subcircuit configured to calculate similarity between the audio segment corresponding to the audio and the sample audio segment in the database; and a second determining subcircuit configured to determine a sample audio segment with the greatest similarity to the audio segment corresponding to the audio, as the sample audio segment with the highest matching degree.

12. The content pushing device of claim 11, wherein the second calculating subcircuit is configured to calculate similarity between an audio name of the audio segment corresponding to the audio and an audio name of the sample audio segment in the database.

13. The content pushing device of claim 9, wherein the first acquirer comprises:

a keyword recognition circuit configured to recognize the inputted audio according to a keyword recognition model to determine the keyword corresponding to the audio.

14. The content pushing device of claim 9, wherein the second acquirer comprises:

a searching circuit configured to search an optional display content associated with the keyword of the audio from a content repository or the Internet, wherein a searched optional display content serves as a candidate display content, and a plurality of display contents and keywords corresponding to the plurality of the display contents are stored in the content repository in advance; and a selecting circuit configured to select at least one candidate display content from all candidate display contents searched by the searching circuit as the content to be displayed.

15. The content pushing device of claim 14, wherein the selecting circuit comprises:

a searching subcircuit configured to acquire keywords corresponding to all candidate display contents from the content repository or the Internet;

a third calculating subcircuit configured to separately calculate the similarity between the keyword of each of the all candidate display contents and the keyword of the audio by a keyword similarity algorithm;

a screening subcircuit configured to screen out the candidate display contents corresponding to similarity that is larger than a similarity threshold among all similarity; and a selecting subcircuit configured to select at least one candidate display content from the candidate display contents screened by the screening subcircuit as the content to be displayed.

16. A display device comprising:

a display screen;

at least one processor; and a storage medium configured to store a program and control, when the program runs, the at least one processor to execute the content pushing method according to claim 1.

* * * * *